United States Patent [19]

Nishibe et al.

[11] 4,306,494
[45] Dec. 22, 1981

[54] TWINE DEVICE FOR ROTARY BALERS

[75] Inventors: Kazuteru Nishibe, Sapporo; Masahiko Kamekura; Naoji Furukawa, both of Hokkaido, all of Japan

[73] Assignee: Farmhand, Inc., Hopkins, Minn.

[21] Appl. No.: 159,819

[22] Filed: Jun. 16, 1980

[30] Foreign Application Priority Data

Jul. 3, 1979 [JP] Japan ............................. 54-92034

[51] Int. Cl.³ .............................................. B65B 13/18
[52] U.S. Cl. ......................................... 100/5; 100/88; 56/341
[58] Field of Search ................... 100/5, 13, 88; 56/341

[56] References Cited

U.S. PATENT DOCUMENTS

| 3,884,138 | 5/1975 | Rice | 100/5 |
|---|---|---|---|
| 3,894,484 | 7/1975 | Anstey | 100/5 |
| 3,913,473 | 10/1975 | Meiers | 100/5 |
| 3,988,977 | 11/1977 | Anderson | 100/5 |
| 4,022,120 | 5/1977 | McAllister | 100/5 |
| 4,024,804 | 5/1977 | Hanson | 100/5 |
| 4,072,095 | 2/1978 | Campbell et al. | 100/5 |
| 4,174,661 | 11/1979 | Mathes | 100/5 |

Primary Examiner—Billy J. Wilhite
Attorney, Agent, or Firm—Wegner, Stellman, McCord, Wood & Dalton

[57] ABSTRACT

A device for wrapping twine around a bale of fodder which is rolled in a baling chamber of an apparatus that moves along a windrow. The device has a twine arm which swings between a transversely extending rest position and a dispensing position extending rearwardly into the baling chamber, a twine clamp near the rest position of the free end of the twine arm, a twine cutting blade near the twine clamp, and a mechanism that operates automatically in response to swinging movement of the twine arm to release the twine clamp as the arm approaches dispensing position and to re-engage the clamp and sever the twine as the arm approaches rest position. The mechanism includes a tension spring that passes overcenter to rapidly release and engage the clamp.

9 Claims, 8 Drawing Figures

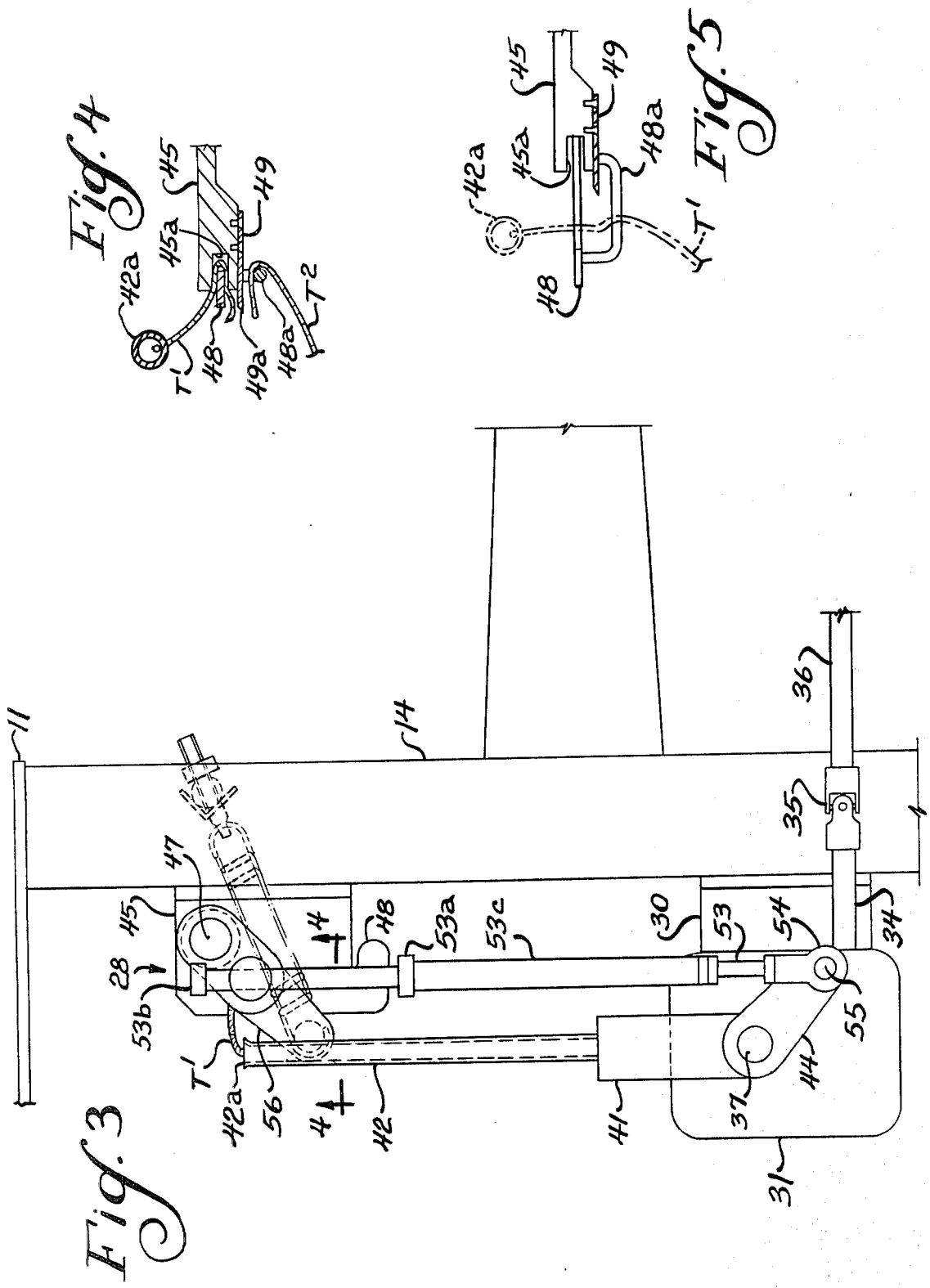

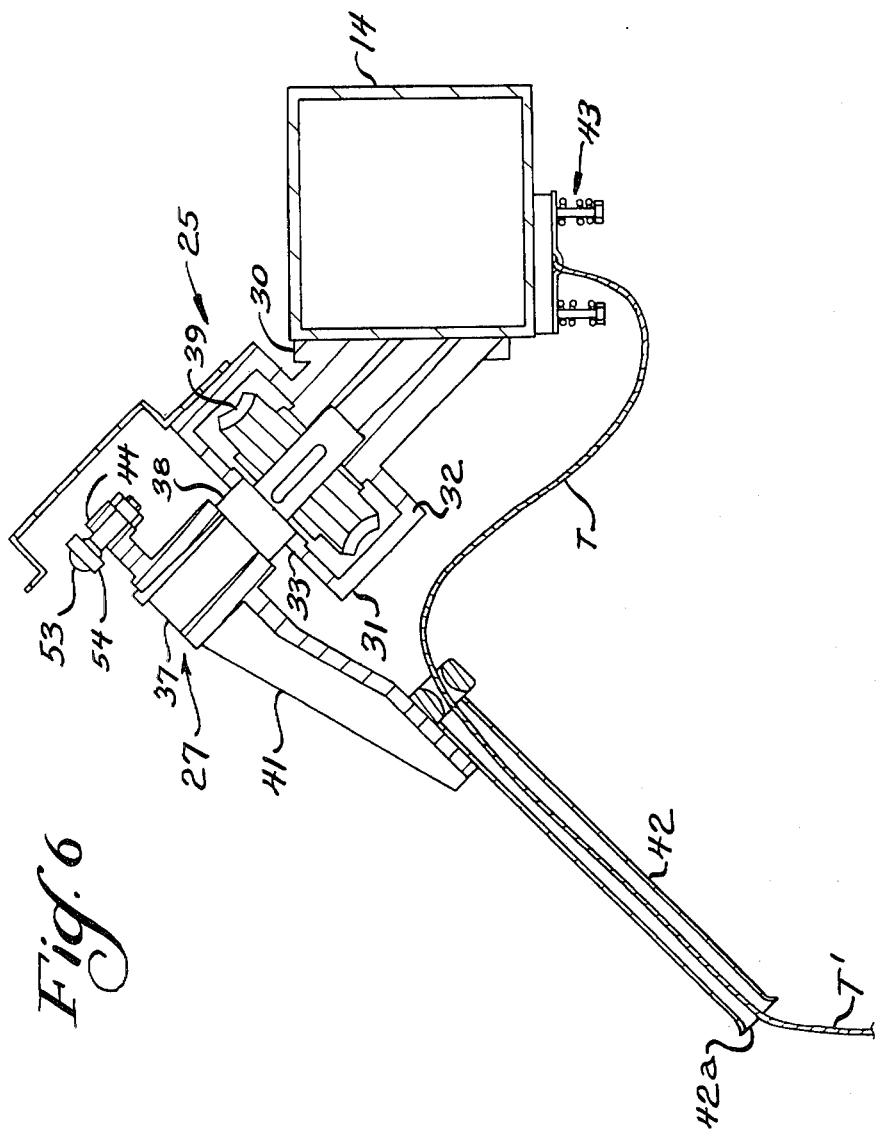

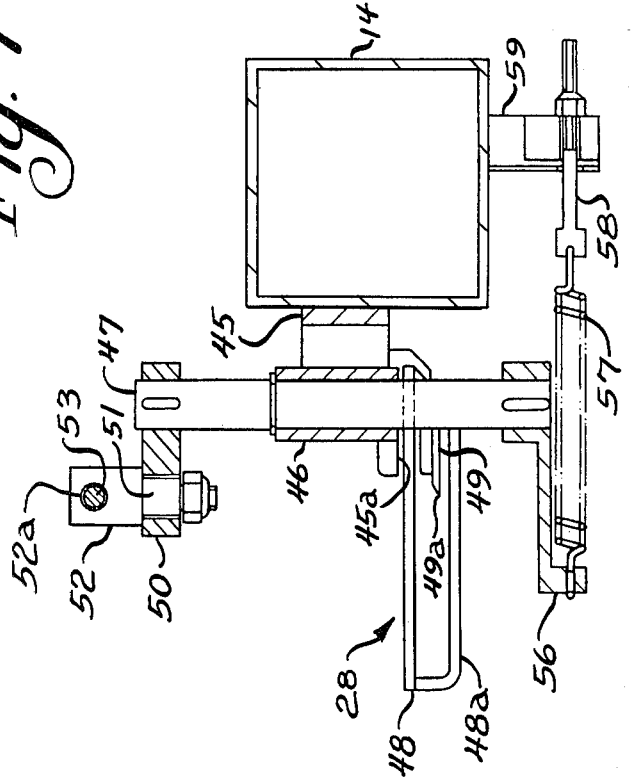

TWINE DEVICE FOR ROTARY BALERS

BACKGROUND OF THE INVENTION

A relatively recent major development in farm equipment is a baler which is moved along a windrow of fodder to roll a large fodder bale which is left on the ground. Such bales may be five or six feet in diameter and weigh several tons. It has been found that the tendency of such bales to disintegrate is greatly reduced if they are wrapped with twine, which may conveniently be guided into the front of the baling chamber by a twine arm (usually a tube). As the twine arm swings across the front of the baling chamber the twine is wrapped spirally about the bale.

A variety of devices have been developed for controlling in the dispensing of the twine by the twine tube. Typical devices known to applicants or their attorney are disclosed in U.S. Pat. Nos. 3,884,138, 3,913,473, 3,988,977, 4,022,120, 4,024,804, and 4,072,095.

The above prior art patents have dealt with a number of different phases of bale twine wrapping. Among the more important ones are means for clamping a short, loose end of twine hanging from the end of the twine arm; withdrawing from the twine arm a predetermined amount of twine before wrapping of the twine around the bale commences, and then automatically releasing the twine hanging from the arm to start the wrapping of a bale; and severing the twine when a bale is completely wrapped coupled with clamping of the short loose end left between the twine cutter and the twine arm.

SUMMARY OF THE INVENTION

The present invention is directed to an improved device for wrapping twine around a bale of fodder which is rolled in a baling chamber of an apparatus of the type heretofore identified. The device has a twine arm which swings between a transversely extending rest position and a dispensing position extending rearwardly into the baling chamber. Twine retaining means adjacent the rest position of the free end of the twine arm includes a movable member to engage and hold the extremity of twine hanging from the free end of the arm, and there is operating means connected to the twine arm and to the movable member to move the member and disengage it from the twine as the twine arm nears dispensing position, so that a predetermined length of twine pulled from the twine arm during its movement from rest position hangs from the free end of the arm into the baling chamber where it is caught in the outer part of the rotating bale and wrapped around the bale while pulling more twine from a twine carrier on the frame of the baler. There is also means adjacent the rest position of the free end of the twine arm for cutting the twine as the arm returns to rest position.

In the most preferred form of the apparatus, the operating means includes a tension spring that passes over-center to rapidly disengage the movable member from the twine as the twine arm nears dispensing position and to rapidly return the movable member into engagement with the twine as the twine arm nears rest position, and it is the movement of the movable member that causes the twine to be cut.

THE DRAWINGS

FIG. 3 is a section similar to FIG. 2, showing the twine arm in rest position;

FIG. 4 is a section on the line 4—4 of FIG. 3;

FIG. 5 is a somewhat schematic section on the line 5—5 of FIG. 2 with the twine arm in broken lines in about the position it occupies just before the parts move to the position of FIG. 4;

FIG. 6 is a section on an enlarged scale on the line 6—6 of FIG. 2;

FIG. 7 is a section on an enlarged scale on the line 7—7 of FIG. 2; and

DETAILED DESCRIPTION

Figure 1:
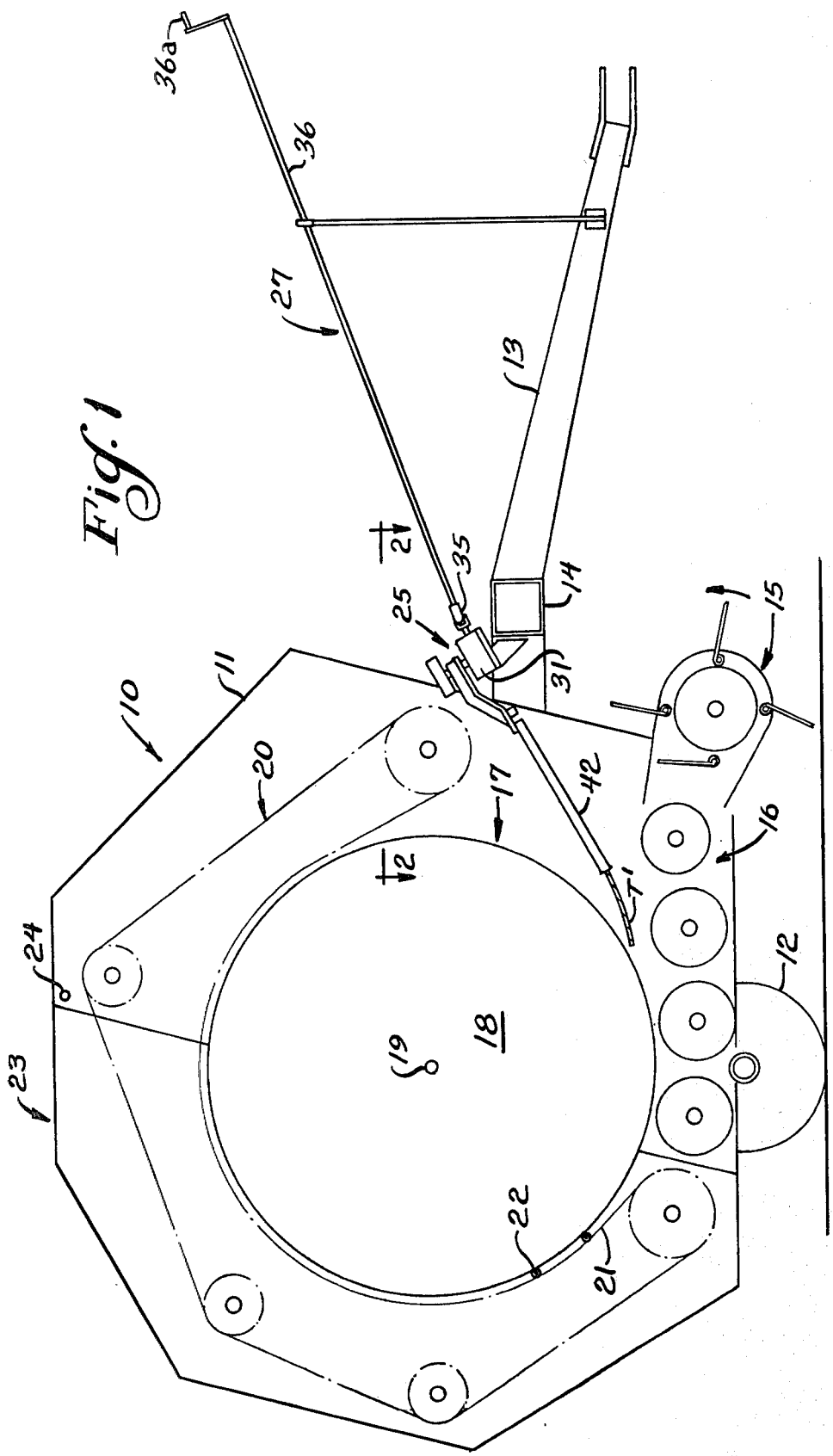
FIG. 1 is a diagrammatic side elevational view of a baler equipped with the twine apparatus of the invention.

Referring to the drawings in detail, and referring first to FIG. 1, a large roll baler, indicated generally at 10, includes a frame 11 which is supported upon ground wheels 12 and has a draft tongue 13 by means of which it may be drawn behind a frame tractor. A tubular frame cross member 14 extends across the forward part of the frame at the rear of the draft tongue 13.

Conventional fodder pickup means, indicated generally at 15, moves fodder from a windrow onto a set of closely spaced, driven rollers which form a conveyor, indicated generally at 16, that also comprises the bottom of a baling chamber, indicated generally at 17. In addition to the conveyor 16, the baling chamber is defined by a pair of laterally spaced roll confining and raddle guiding disks, such as the disk 18 which is journalled at 19 in the frame 11, and continuous bale rolling means, indicated generally at 20, which consists of a pair of endless chains, such as the chain 21, connected by transverse raddles 22 the outer ends of which rest upon the rotatable disks 18. A gate, indicated generally at 23, is pivoted at 24 so that it may be elevated to release a finished bale from the chamber 17.

Figure 2:
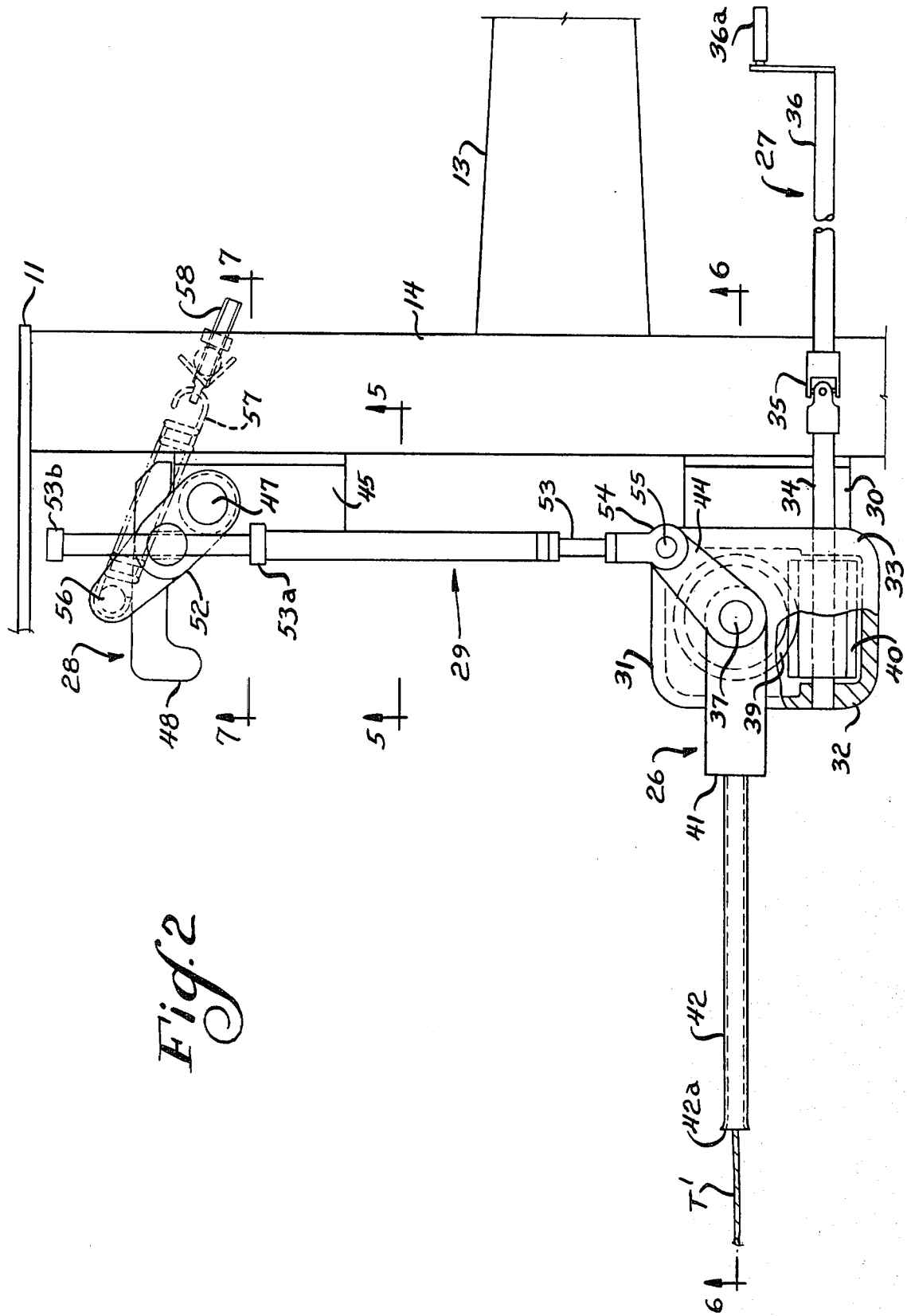
FIG. 2 is a transverse sectional view on an enlarged scale taken substantially as indicated along the line 2—2 of FIG. 1, with parts broken away, showing the twine arm in dispensing position.

The twine wrapping device of the present invention is indicated generally at 25, and is best seen in FIGS. 2, 6 and 7 to be mounted upon the baler cross fame member 14. The twine device 25 consists generally of a twine arm, indicated generally at 26; means, indicated generally at 27, for swinging the twine arm between a rest position illustrated in FIG. 3 and a dispensing position illustrated in FIG. 2; twine engaging and cutting means, indicated generally at 28; and operating means for the engaging and cutoff means, indicated generally at 29.

Referring now to FIGS. 2 and 6, an arm mounting bracket 30 is secured to the frame cross member 14 and supports a gear housing 31 that has a side wall 32 and an end wall 33. A drive shaft 34 is journalled in the side wall 32 and has a universal joint connection 35 to a hand crank 36 an operating handle 36a of which is located to be convenient to an operator driving a tractor.

A supporting shaft 37 is journalled in a bushing 38 in the gear box end wall 33, and keyed to the supporting shaft 37 within the gear box 31 is a gear 39 which is engaged by a worm gear 40 on the drive shaft 34 so that rotation of the drive shaft by the crank 36 rotates the supporting shaft 37.

Keyed to the upper end of the supporting shaft 37 is a radially extending first bell crank arm 41 which carries a twine arm, or twine tube 42. Twine T from a conventional twine supply (not shown) is conducted in a known way through a tensioning means, indicated generally at 43, and along the interior of the twine tube 42 so that the end portion T1 of the twine hangs from the end 42a of the twine tube. Extending from the supporting shaft 37 at an obtuse angle relative to the first bell crank arm 41 is a second bell crank arm 44 to which the operating mechanism 29 for the twine engaging means 28 is connected.

Referring now particularly to FIGS. 2 to 5 and 7, the twine device also includes a bracket 45 which is fixed to the cross frame member 14 in a position to support the twine engaging and cutting mechanism 28 in such a location that the free end 42a of the twine arm 42 is immediately adjacent the mechanism 28 when the twine arm is in the rest position illustrated in FIG. 3. A bushing 46 on the bracket 45 journals a shaft 47 which carries a part of the twine engaging means 28 and major parts of the operating means 29.

Welded to the shaft 47 below the bushing 46 is a twine guide fork 48 which is provided with an offset guide bar 48a. As seen in FIGS. 4 and 5, there is a slot 45a in the bracket 45, and when twine tube 42 is in the rest position of FIG. 3, the guide fork 48 is seated in the slot 45a so that the extremity T1 of the twine is clamped between the guide fork and the sides of the slot. A twine cutting blade 49 is fixed to the bottom of the bracket 45 with its cutting edge 49a in a horizontal plane between those of the guide fork 48 and the guide bar 48a.

The operating mechanism 29 for the twine engaging means 28 includes a crank arm 50 which is keyed adjacent the upper end of the shaft 47, and a pin 51 is journalled in a hole in the crank arm 50 and has an enlarged head 52.

A push rod 53 has one end provided with a hollow boss 54 which is journalled on an upstanding pin 55 on the lever arm 44 (FIGS. 2 and 6); and the push rod 53 is slidable in a bushing 52a in the head 52 as seen in FIG. 7. An operating collar 53a is fixed to the push rod 53 between the head 52 and the pin 55, and a second collar 53b is at the extremity of the push rod on the opposite side of the head 52. The push rod 53 includes sleeve means 53c for adjusting the space between the collars 53a and 53b and the distance from the pin 55 to the collar 53b.

Referring again to FIG. 7, at the extreme lower end of the shaft 47 is an arm 56 which is adapted to receive a loop at one end of a tension spring 57, the opposite end of which is connected to an anchor bolt 58 that extends through a spring anchor bracket 59 that is fixed to the under side of the cross frame member 14. A comparison of FIG. 3 in which the twine arm is in its rest position with FIG. 2 in which the twine arm is in its dispensing position will disclose that the spring arm 56 rotates approximately 90° in its movement from one position to the other, and carries the tension spring 57 overcenter in doing so.

Operation of the twine wrapping device is best understood by a comparison of FIGS. 2, 3, 4, 5 and 8. Except during a twine wrapping operation, the mechanism occupies the position of FIG. 3, with the twine arm 42 extending parallel to the cross frame member 14 and the push rod 53. As seen in FIG. 4, the loose end T1 of the twine is clamped between the fork 48 and the sides of the slot 45a.

Figure 8:
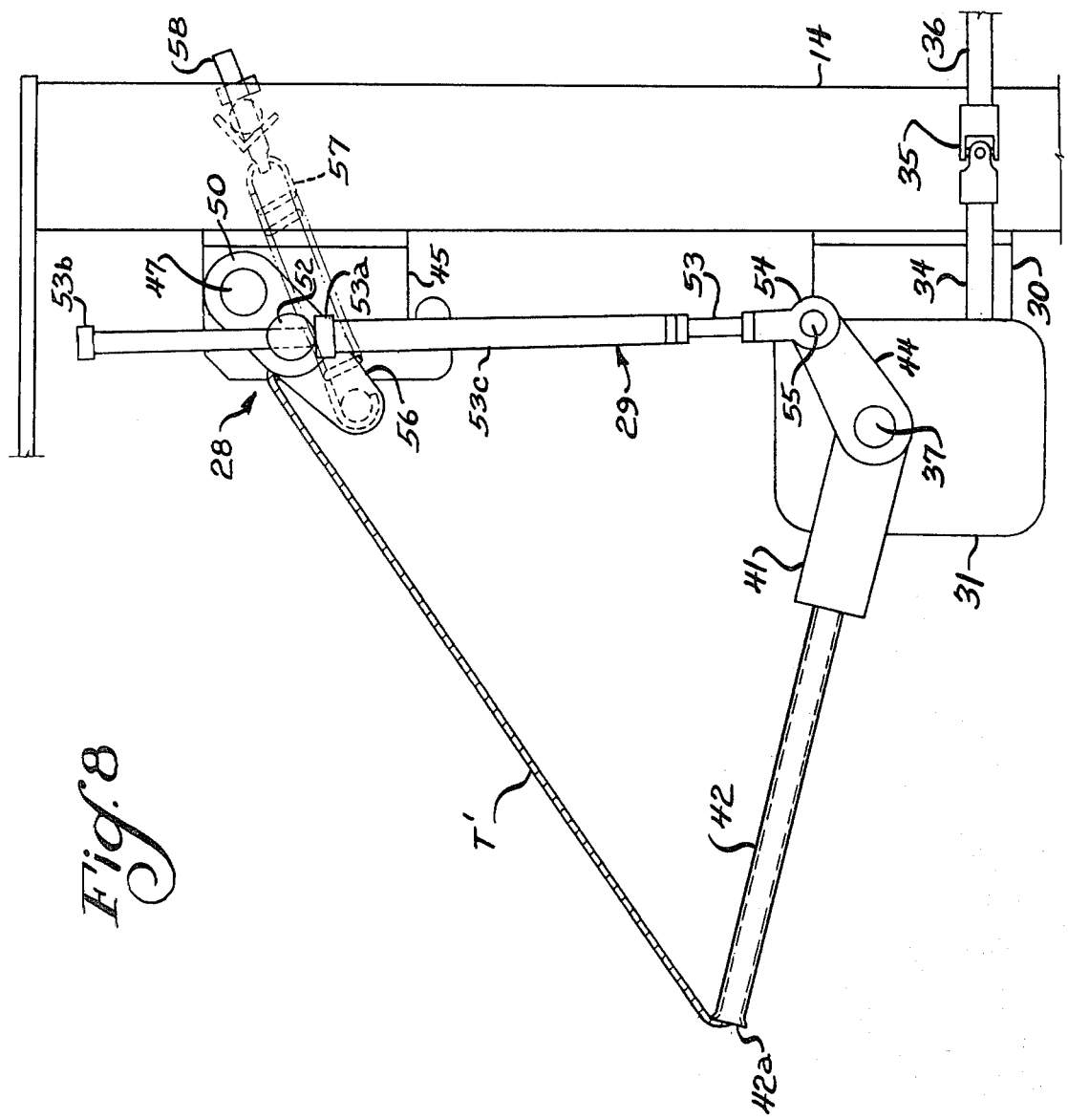
FIG. 8 is a section like FIG. 2 with the twine arm approaching the dispensing position of FIG. 2.

At the end of a baling operation the operator uses the crank 36 to swing the twine tube from the position of FIG. 3 through the position of FIG. 8 to the position of FIG. 2. As shown in FIG. 8, the free end T1 of the twine is still clamped in the slot 45a by the twine fork 48, so a predetermined length of twine is pulled from the end 42a of the twine tube before the twine is released from engagement between the twine fork 48 and the sides of the slot 45a. During swinging movement of the twine tube 42 the second bell crank arm 44 moves the push rod endwise, as can be seen by comparing FIGS. 3 and 8, and when the operating collar 53a strikes the head 52 it rotates the shaft 47 which stretches the tension spring 57 until the spring passes overcenter, after which the energy built up in the spring rotates the assembly including the shaft 47 at high speed to snap the fork 48 out of the slot 45a and release the length of twine T1 so that it may hang into the front of the baling chamber 17 where it is picked up in the outer part of the forming bale which pulls twine rapidly through the twine tube 42 from the twine carrier.

As the twine is wrapped around the bale the operator reverses the rotation of the crank 36 so as to swing the twine tube 42 from the position of FIG. 2 toward the position of FIG. 3 and thus wrap the twine spirally around the bale. The operator has complete control over the number of turns of twine which will be wrapped around the bale.

As the twine tube is returned toward the position of FIG. 3, the push rod 53 is moved endwise, and eventually the second operating collar 53b stikes the head 52 and starts to rotate the shaft 47 and thus move the twine fork 48 toward a twine engaging position. This again stretches the tension spring 57, and when the spring passes overcenter it rapidly rotates the shaft 47 to drive the twine fork 48 rapidly from the position of FIG. 5 to the position of FIG. 4. When twine is being wrapped around a bale, of course, it is pulled taut between the end of the twine tube 42 and the rotating bale, and the taut twine is caught between the twine fork 48 and the bar 48a which pull it against the cutting edge 49a of the twine cutting blade 49. The severed length of twine T2 is rapidly rotated around the forming bale, after which the bale is ready to be discharged from the baling chamber.

The foregoing detailed description description has been given for clearness of understanding only and no unnecessary limitations should be understood therefrom as modifications will be obvious to those skilled in the art.

We claim:

1. In an apparatus having a frame and means defining a baling chamber in which fodder is rolled into a bale as the apparatus moves forwardly along a windrow, a device for wrapping twine from a twine supply on the apparatus around a bale as bale formation is being completed, said device comprising, in combination:

a twine arm movably supported on the frame forward of the baling chamber and having a free end from which twine hangs;

means for swinging said twine arm between a rest position extending generally transversely of the frame and a twine dispensing position extending rearwardly into the baling chamber;

twine retaining means adjacent the rest position of said free end of the twine arm including a movable member which engages the twine hanging from said free end at rest position and holds said twine while said twine arm swings toward dispensing position;

operating means actuated by movement of the twine arm to move said movable member quickly out of engagement with the twine as the twine arm nears dispensing position, and to return said member quickly into re-engagement with the twine as the twine arm nears rest position, whereby a predetermined length of twine pulled from the twine arm during movement thereof to dispensing position hangs from the free end of said arm into the baling chamber where it is caught in the outer part of the rotating bale and wrapped therearound;

and means adjacent the rest position of the free end of the twine arm for cutting the twine as the arm nears said rest position.

2. The device of claim 1 in which the twine cutting means includes a fixed blade, and re-engagement of the movable member with the twine pulls the twine against said fixed blade to sever it.

3. The device of claim 2 in which the twine retaining means includes a fixed element against which the movable member clamps the twine, and the fixed blade is so positioned as to sever the twine between said fixed element and the bale.

4. The device of claim 1 in which the operating means is connected to the twine arm and to the movable member and includes lost motion connection so the movable member is moved only as the twine arm nears dispensing position and rest position.

5. The device of claim 4 in which the operating means includes a rotatable operating shaft, a crank arm on said operating shaft, and in which the movable member is fixed to said operating shaft.

6. The device of claim 5 in which the operating means includes a push rod slidably engaged with the crank arm, and collars on the push rod on opposite sides of the crank arm to turn the operating shaft as the twine nears dispensing position and rest position.

7. The device of claim 6 in which the twine arm is a first arm of a bell crank, and there is a second arm of said bell crank to which the push rod is pivotally connected.

8. The device of claim 1 in which the means for swinging the twine arm includes a rotatable supporting shaft journalled on the frame, means mounting the twine arm to extend radially from said supporting shaft, a gear on said supporting shaft, and a drive shaft having a worm engaged with said gear.

9. The device of any of the preceding claims in which the operating means includes a pivoted arm which is rotated by the operating means and which is connected to the movable member, a tension spring is fixed to an anchor of the frame and secured to said arm so as to be stretched and move overcenter as said pivoted arm is rotated, and in which the spring collapses after said overcenter movement to move the movable member rapidly into and out of twine engaging position independently of any further movement of the twine arm.

* * * * *